May 23, 1944.   G. V. JOHNSON   2,349,353
INDUSTRIAL TRUCK
Filed Feb. 10, 1943   2 Sheets-Sheet 2
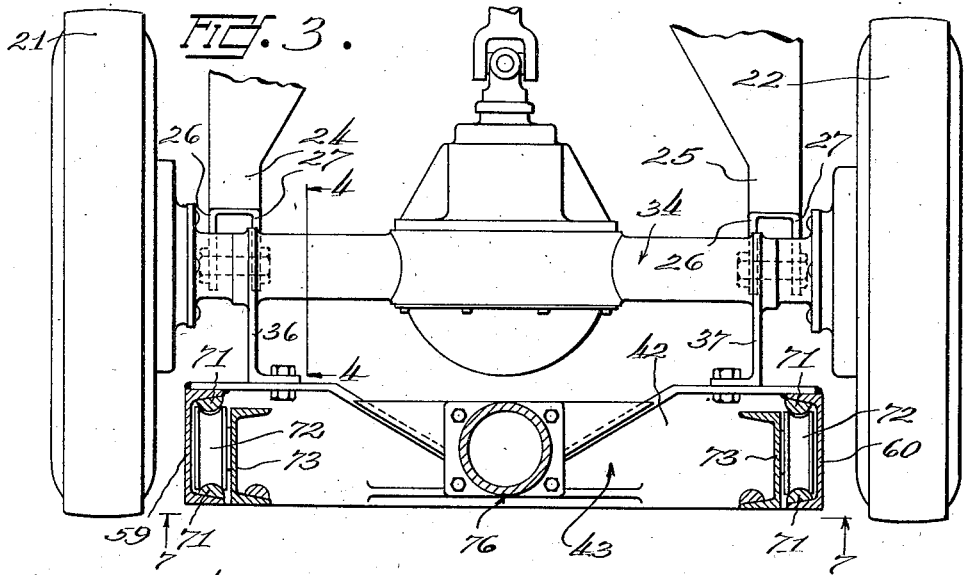
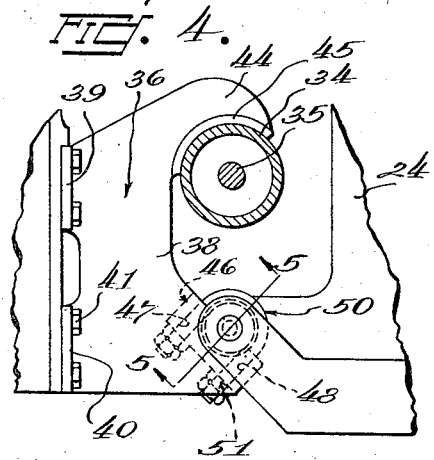
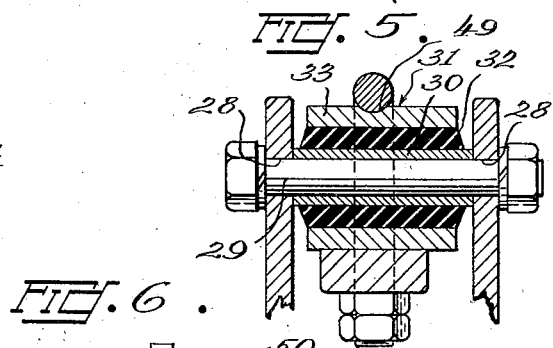
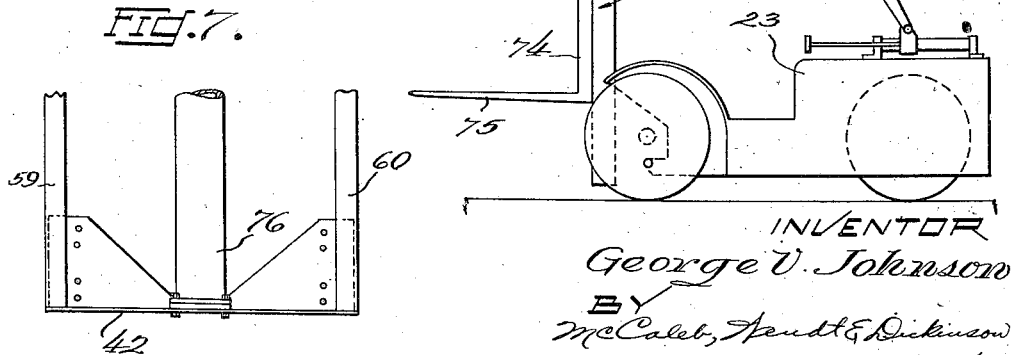
INVENTOR
George V. Johnson
BY
McCaleb, Hendt & Dickinson
ATTORNEYS.

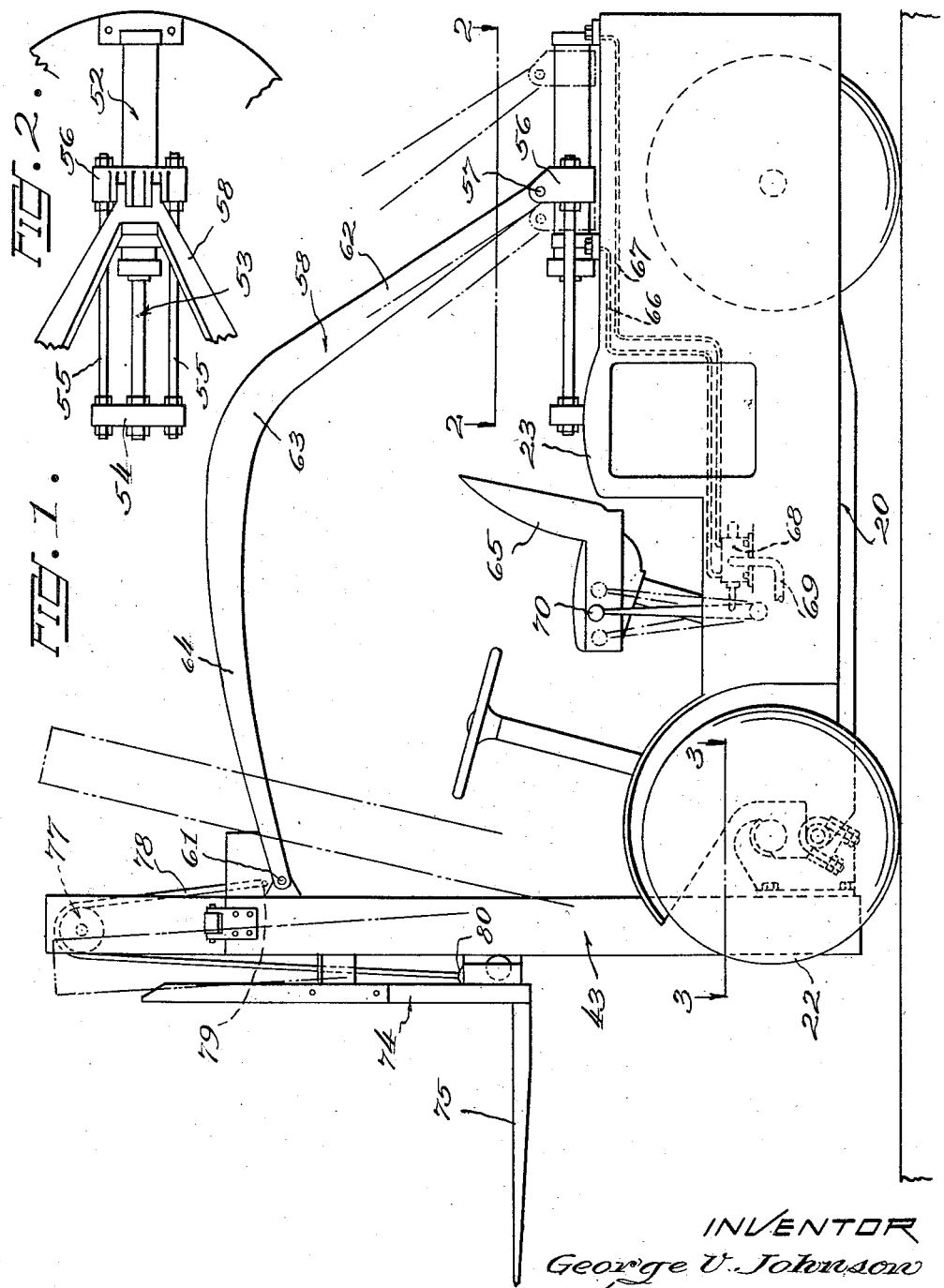

Patented May 23, 1944

2,349,353

UNITED STATES PATENT OFFICE 2,349,353

INDUSTRIAL TRUCK

George V. Johnson, Portland, Oreg., assignor to Willamette Hyster Company, Portland, Oreg., a corporation of Oregon Application February 10, 1943, Serial No. 475,364

16 Claims. (Cl. 214—113)

The present invention relates to industrial trucks, and is particularly concerned with that type of industrial truck comprising an automotive vehicle having a generally upwardly extending vertical frame at one end provided with lifting arms adapted to be used for lifting, moving, and stacking various types of merchandise.

The present application relates to an improvement in the inventions covered by my prior applications, Serial No. 427,347, filed January 19, 1942, and Serial No. 409,173, filed September 2, 1941, now Patent No. 2,321,029, granted June 8, 1943, for industrial trucks.

One of the objects of the present invention is the provision of an improved industrial truck construction by means of which the bending strains which would otherwise be induced in the frame of the truck, are eliminated and carried directly by the axle housing.

Another object of the invention is the provision of an improved industrial truck chassis in which the frame is subjected principally to compression by virtue of the load which is placed upon the elevator.

Another object of the invention is the provision of an improved industrial truck construction in which the weight is removed from the frame and placed directly on the axle housing, so that the truck is adapted to carry a greater load.

Another object of the invention is the provision of the industrial truck structure, which is provided with a supporting bearing that is more quiet and adapted to permit a certain amount of misalignment.

Another object of the invention is the provision of an improved steering wheel supporting structure for industrial trucks of the class described, which gives the truck increased stability and rigidity against tipping or tilting.

Another object of the invention is the provision of an improved tilting mechanism for the supporting frame of an industrial truck of the class described, which is simpler and more effective, and which is adapted to be manufactured at a lower cost by virtue of the elimination of many parts previously considered necessary in the trucks of the prior art.

Other objects and advantages of the invention will be apparent from the following description and the accompanying drawings, in which similar characters of reference indicate similar parts throughout the several views.

Referring to the drawings, of which there are two sheets,

Fig. 1 is a diagrammatic side elevational view of an industrial truck embodying the invention;

Fig. 2 is a fragmentary plan view of a part of the truck, taken on the plane of the line 2—2;

Fig. 3 is a fragmentary sectional view of the front axle housing construction, taken on the plane of the line 3—3 of Fig. 1;

Fig. 4 is a fragmentary sectional view, taken on the plane of the line 4—4 of Fig. 3, looking in the direction of the arrows;

Fig. 5 is a fragmentary sectional view, taken on the plane of the line 5—5 of Fig. 4, looking in the direction of the arrows;

Fig. 6 is a diagrammatic side elevational view, similar to Fig. 1, showing the truck in its entirety; and Fig. 7 is a fragmentary vertical sectional view, taken on the plane of the line 7—7 of Fig. 3, looking in the direction of the arrows.

The industrial truck forming the subject-matter of the present invention is preferably of the type having its chassis 20 provided with a pair of driven wheels 21, 22 located at the forward end of the truck. The chassis is covered by a housing 23 (Fig. 6) which is shown as being made of cast metal, but which may also be built of a channeled frame and/or sheet metal plates.

The chassis 20 has a pair of forwardly extending frame members 24 and 25, which are preferably of channeled construction, with a pair of side flanges 26, 27. These side flanges are provided with aligned bores 28 for receiving the screw bolt 29, which supports a steel sleeve 30, forming a part of a rubber bearing 31. The steel sleeve has cemented to it a rubber sleeve 32, and the rubber sleeve 32 is cemented to the inside of a sealed outer steel sleeve 33. The rubber sleeve 32 is compressed between the steel sleeves 30 and 33. The inner steel sleeve 30 on the bolt 29 is clamped between the flanges 26 and 27.

The axle housing 34 is rotatably mounted on the shaft 35, which drives the wheels 21 and 22. A bracket 36 or 37 is mounted fixedly on the axle housing 34 adjacent each wheel. Each bracket 36 or 37 has a flat body flange 38, which has a pair of attaching flanges 39 and 40 on its front end. The attaching flanges 39 and 40 are provided with through bolts 41 for securing the brackets 36 to the base frame member 42 of the load carrying frame 43.

Each bracket 36 and 37 has a rearwardly extending arm 44 at its upper side, and each arm 44 has a partially cylindrical flange 45. The flange 45 is welded in each case to the axle housing 34 and rests on the top side of the axle housing. Thus the brackets 36 and 37 serve to place the weight of the load supporting frame 43 on the axle housing.

Each bracket 36 and 37 is provided with an integral laterally projecting lug, and the lugs 46 have a pair of parallel bolt holes 47, 48. The outer steel sleeve 33 of the bearing 31 preferably has a groove 49 for receiving a two-legged U-shaped bolt 50, each leg of the bolt 50 passing through the bolt holes 47 or 48, and the double lock nuts 51 clamp the bearing 31 to the lug 46.

Any twisting movement between the parts of the bearing 31 takes place by virtue of the shear of the rubber. This provides a very quiet rotative connection which permits a certain amount of misalignment of the parts.

The truck is preferably provided (Fig. 1) with a hydraulic cylinder 52, having a piston connected to the piston rod 53. The piston rod 53 is connected to a crosshead 54, which carries a pair of connecting rods 55. Connecting rods 55 are connected to a second crosshead 56, which is pivotally connected at 57 to a two-legged curved connecting member 58.

The load supporting member 43 has a pair of vertically extending channeled frame members 59, 60. These are fixedly secured to the base frame member 42, and each vertical frame member 59, 60 is pivotally connected at 61 to one of the legs of the connecting member 58.

The connecting member 58 has both of its legs extending upward at 62 and curved horizontally at 63 so that the horizontal portions 64 extend over the driver who sits in the seat 65. The connecting member 58 is subjected to bending stresses, and therefore it is thicker at its middle portion 63. The hydraulic cylinder 52 is connected by a pair of conduits 66, 67 to a two-way valve 68, which is connected by a pipe 69 to a motor driven pump, which supplies a source of hydraulic fluid under pressure, such as oil.

Thus the handle 70 may be used to actuate the two-way valve 68 and to control the movements of the crossheads 54, 56 so that the supporting frame 43 may be tilted from the vertical position of Fig. 1 to the dotted line positions.

The vertical frame members 59, 60 are provided with the guides 71 for receiving the rollers 72, which are carried by the vertical frame members 73 of the elevator 74. Additional rollers and guides are provided so that the elevator 74, with its load supporting table 75, may move up and down on the vertical frame members 59 and 60. A hydraulic piston and cylinder 76 acts on a frame member carrying the pulley 77, over which the cable 78 passes. The cable 78 is anchored at 79 on the frame and at 80 on the elevator.

The operation of the truck is as follows: The load carried by the load supporting frame 43 is transmitted directly to the axle housing by the brackets 36, 37. The chassis has its forwardly extending portions 24 and 25 connected to the axle through the bearing 31 and the brackets 36, 37. When the load supporting frame tilts, the axle housing 34 merely turns on its shaft 35, and the bracket 36 causes a turning movement at the bearing 31. This moves the rear wheel forward when the top of the load supporting frame tilts backward. It causes the rear wheel to move backward with respect to the front wheels when the load supporting frame tilts forward. The chassis 20 is principally in compression, and bears only slight bending strains, due to the load on the elevator 74.

It will thus be observed that I have invented an improved industrial truck, in which the load is placed directly on the axle housing, and bending strains in the chassis are eliminated. My construction is simpler and stronger than any of the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an industrial truck, the combination of a chassis having a pair of forwardly extending frame members, supporting means movably connected to each of said forwardly extending frame members and fixedly connected to an axle housing, said axle housing rotatably supporting a shaft and wheels, said axle housing also supporting a load carrying frame.

2. In an industrial truck, the combination of a chassis having a pair of forwardly extending frame members, supporting means movably connected to each of said forwardly extending frame members and fixedly connected to an axle housing, said axle housing rotatably supporting a shaft and wheels, said axle housing also supporting a load carrying frame, and actuating means connected to the chassis and to the load supporting frame for moving the load supporting frame to a plurality of different angular positions.

3. In an industrial truck, the combination of a chassis having a pair of forwardly extending frame members, supporting means connected to each of said forwardly extending frame members and to an axle housing, said axle housing rotatably supporting a shaft and wheels, said axle housing also supporting a load carrying frame, said means being pivotally mounted on said chassis and fixedly mounted on said axle housing.

4. In an industrial truck, the combination of a chassis having a pair of forwardly extending frame members, supporting means connected to each of said forwardly extending frame members and to an axle housing, said axle housing rotatably supporting a shaft and wheels, said axle housing also supporting a load carrying frame, said means being pivotally mounted on said chassis, and fixedly mounted on said axle housing, and actuating means connected to the chassis and to the load supporting frame for moving the load supporting frame to a plurality of different angular positions.

5. A connecting construction for the load supporting frame and the chassis of an industrial truck, comprising a bracket having a body flange and having a curved load supporting flange adapted to be fixedly secured to an axle housing, said body flange having attaching means for supporting the load supporting frame, and having a bearing connection for securement to a chassis, said bearing connection comprising a laterally projecting lug, carrying a U-shaped bolt clamped about a trunnion carried by the chassis, said trunnion comprising a metal sleeve having a cylindrical member rotatably mounted inside said sleeve.

6. A connecting construction for the load supporting frame and the chassis of an industrial truck, comprising a bracket having a body flange and having a curved load supporting flange adapted to be fixedly secured to an axle housing, said body flange having attaching means for supporting the load supporting frame, and having a bearing connection for securement to a chassis, said bearing connection comprising a laterally projecting lug, carrying a U-shaped bolt clamped about a trunnion carried by the chassis, said trunnion comprising a metal sleeve having a cylindrical member rotatably mounted inside said sleeve and compressible elastic means between said sleeve and said cylindrical member.

7. An improved linkage for industrial trucks comprising a chassis, an axle housing, a bracket fixedly secured to the axle housing and pivotally secured to the chassis, a load supporting vertical frame member fixed to the bracket and a connecting member pivotally connected to the vertical frame member, and connected at its other end to an actuating means carried by the chassis.

8. An improved linkage for industrial trucks comprising a chassis, an axle housing, a bracket fixedly secured to the axle housing and pivotally secured to the chassis, a load supporting vertical frame member fixed to the bracket and a connecting member pivotally connected to the vertical frame member, and connected at its other end to an actuating means carried by the chassis, said actuating means comprising a hydraulic cylinder and piston.

9. An improved linkage for industrial trucks comprising a chassis, an axle housing, a bracket fixedly secured to the axle housing and pivotally secured to the chassis, a load supporting vertical frame member and a connecting member pivotally connected to the vertical frame member, and connected at its other end to an actuated means carried by the chassis, the pivotal connection between said connecting means and said chassis comprising a rubber mounted bushing.

10. In a lift truck, the combination of a chassis with dirigible wheel means at one end, an upright load-carrying frame located at the other end of the chassis, and having a rearwardly extending supporting means on its rear side, a traction unit comprising a pair of drive wheels, an axle, and an axle housing, said supporting means being fixedly secured to the upper part of said axle housing, and having a rearward extension under said axle housing, and means for attaching the forward end of said chassis to said rearward extension, whereby the tendency of the upright frame to pivot forward is counter-balanced by the weight of the chassis and its associated parts on said rearward extension.

11. In a lift truck, the combination of a chassis with dirigible wheel means at one end, an upright load-carrying frame located at the other end of the chassis, and having a rearwardly extending supporting means on its rear side, a traction unit comprising a pair of drive wheels, an axle, and an axle housing, said supporting means being fixedly secured to the upper part of said axle housing, and having a rearward extension under said axle housing, and means for attaching the forward end of said chassis to said rearward extension, whereby the tendency of the upright frame to pivot forward is counter-balanced by the weight of the chassis and its associated parts on said rearward extension, said attaching means comprising a bearing structure adapted to permit relative rotative movement between the chassis and the upright frame when the upright frame is tilted.

12. In a lift truck, the combination of a chassis with dirigible wheel means at one end, an upright load-carrying frame located at the other end of the chassis, and having a rearwardly extending supporting means on its rear side, a traction unit comprising a pair of drive wheels, an axle, and an axle housing, said supporting means being fixedly secured to the upper part of said axle housing, and having a rearward extension under said axle housing, and means for attaching the forward end of said chassis to said rearward extension, whereby the tendency of the upright frame to pivot forward is counter-balanced by the weight of the chassis and its associated parts on said rearward extension, said attaching means comprising a bearing structure adapted to permit relative rotative movement between the chassis and the upright frame when the upright frame is tilted, said bearing structure including a trunnion and a sleeve rotatable with respect to flange and resilient compressible means located between said sleeve and trunnion.

13. In an improved linkage for lift trucks of the type having a tilting upright frame provided with a load-carrying member, the combination of a traction unit having a pair of wheels carried by axles mounted in axle housings, an upright frame having a pair of rearwardly extending arms resting on said axle housings, said upright frame also having a pair of rearwardly extending arms under said axle housings, and a vehicle chassis having a pair of forwardly extending members supported on said latter rearwardly extending arms, whereby the forward tilting tendency of the upright frame is partially counter-balanced by the weight of the forward part of the chassis on said latter rearwardly extending arms.

14. In an improved linkage for lift trucks of the type having a tilting upright frame provided with a load-carrying member, the combination of a traction unit having a pair of wheels carried by axles mounted in axle housings, an upright frame having a pair of rearwardly extending arms resting on said axle housings, said upright frame also having a pair of rearwardly extending arms under said axle housings, and a vehicle chassis having a pair of forwardly extending members supported on said latter rearwardly extending arms, whereby the forward tilting tendency of the upright frame is partially counter-balanced by the weight of the forward part of the chassis on said latter rearwardly extending arms, hydraulic means carried by said chassis for effecting a tilting of said upright frame, and a rigid connecting link between said hydraulic means and said upright frame.

15. In an improved linkage for lift trucks of the type having a tilting upright frame provided with a load-carrying member, the combination of a traction unit having a pair of wheels carried by axles mounted in axle housings, an upright frame having a pair of rearwardly extending arms resting on said axle housings, said upright frame also having a pair of rearwardly extending arms under said axle housings, and a vehicle chassis having a pair of forwardly extending members supported on said latter rearwardly extending arms, whereby the forward tilting tendency of the upright frame is partially counter-balanced by the weight of the forward part of the chassis on said latter rearwardly extending arms, hydraulic means carried by said chassis for effecting a tilting of said upright frame, and a rigid connecting link between said hydraulic means and said upright frame, said connecting link extending from an upper portion of said frame horizontally backward and downward to hydraulic means located at the top rear of said chassis.

16. In an improved linkage for lift trucks of the type having a tilting upright frame provided with a load-carrying member, the combination of a traction unit having a pair of wheels carried by axles mounted in axle housings, an upright frame having a pair of rearwardly extending arms resting on said axle housings, said upright frame also having a pair of rearwardly extending arms under said axle housings, and a vehicle chassis having a pair of forwardly extending members supported on said latter rearwardly extending arms, whereby the forward tilting tendency of the upright frame is partially counterbalanced by the weight of the forward part of the chassis on said latter rearwardly extending arms, hydraulic means carried by the said chassis for effecting a tilting of said upright frame, and a rigid connecting link between said hydraulic means and said upright frame, said chassis being connected to said latter rearwardly extending arms by a rotatable connection, whereby tilting of the upright frame causes the axle housing to rotate on the axle and causes relative pivotal movement between said chassis and said latter rearwardly extending arm.

GEORGE V. JOHNSON.